No. 813,627. PATENTED FEB. 27, 1906.
B. E. ELDRED.
CEMENT BURNING PROCESS AND APPARATUS THEREFOR.
APPLICATION FILED SEPT. 9, 1904.
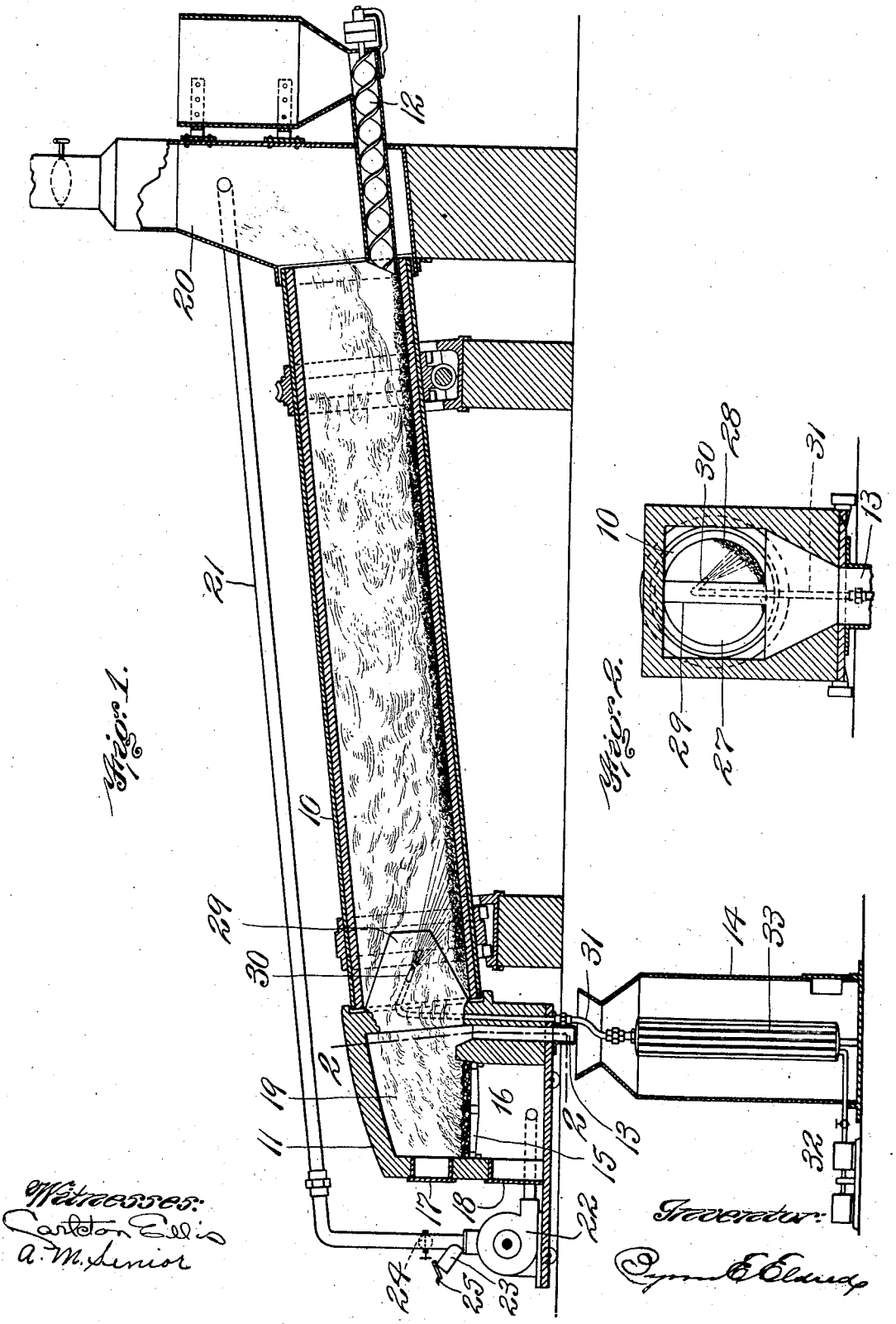

UNITED STATES PATENT OFFICE.

BYRON E. ELDRED, OF BROOKLINE, MASSACHUSETTS, ASSIGNOR TO COMBUSTION UTILITIES COMPANY, OF NEW YORK, N. Y., A CORPORATION OF NEW YORK.

CEMENT-BURNING PROCESS AND APPARATUS THEREFOR.

No. 813,627. Specification of Letters Patent. Patented Feb. 27, 1906.

Application filed September 9, 1904. Serial No. 223,879.

*To all whom it may concern:*

Be it known that I, BYRON E. ELDRED, a citizen of the United States, and a resident of Brookline, in the county of Norfolk and State of Massachusetts, have invented certain new and useful Improvements in Cement-Burning Processes and Apparatus Therefor, of which the following is a specification.

This invention relates to the art of burning Portland cement and performing other roasting operations of an analogous character, especially where such operations are carried on in long reverberatory furnaces, such as inclined rotary barrel furnaces or kilns. Heretofore cement has been burned in such furnaces with a long flame of high temperature, usually produced with a blast of powdered coal and compressed air. This gave a very intense heat which performed the calcination or elimination of carbonic-acid gas from the lime in the cement-forming material and also fused or sintered the material into cement clinkers which then passed out of the kiln. Such a flame as ordinarily produced is difficult of regulation, destructive of the lining of the kiln, and wasteful of fuel. I have discovered that much of the trouble in these respects is due to employing the same flame or a plurality of such flames for performing both the calcining and the clinkering, and that these difficulties can be overcome by more or less separating the calcining and sintering steps and performing them by flames of different temperatures or by using a flame of low enough temperature to economically perform the calcining step and modifying a portion of said flame to afford a sintering temperature.

Another feature of my invention consists in the discovery of a flame or heating agent applicable to cement-burning and possessing the necessary property or capability of affording a relatively low calcining heat subject to being raised to a sintering heat by local intensification. A flame of this character can be produced by the method described in my Patent No. 692,257 by passing through the fuel-body a draft-current of air and a small portion of the stack-gases or products of combustion (mainly nitrogen and carbon dioxid) from the kiln or furnace whereby the flame is rendered voluminous, inflated, and slow-burning, and it may be locally intensified in a desired region by means of a high-pressure gaseous jet, such as an air-jet, preferably directed upon the cement material near its exit from the kiln to afford the high temperature necessary to the production of a hard clinker. The present application claims specifically the production of such a flame from an external fuel-bed and also certain apparatus useful or necessary to the performance of cement-burning with this agent.

The invention is generically claimed in other applications and more especially in an application Serial No. 254,474, in which the process is described as carried out with powdered fuel.

Of the accompanying drawings, Figure 1 represents a longitudinal section of a cement-kiln for carrying my invention into effect. Fig. 2 represents a section on line 2 2 of Fig. 1.

The same reference characters indicate the same parts in both views.

Referring to the drawings, 10 indicates a rotary inclined cylinder whose interior constitutes the laboratory or hearth-chamber of a reverberatory furnace for burning cement, the material being fed in at the end more remote from the fire-box 11 by a conveyer 12 and after traversing the cylinder being discharged through an opening 13 into a cooler 14 in the usual way.

15 is the grate of the fire-box, on which the bed of fuel, preferably coal, is supported, and 16 is the ash-pit below the grate, the doors 17 18 of both fuel-chamber 19 and ash-pit 16 being preferably closed during the operation of the furnace.

From the stack 20 a pipe 21 leads back to the ash-pit 16 below the grate 15, and in this pipe is interposed a fan-blower 22, by which a small portion of the products of combustion and calcination are drawn back and forced through the fuel-bed on the grate in company with a larger supply of air drawn into the pipe 21 through an air-inlet 23, substantially as described in my aforesaid patent, No. 692,257. The suction-pipe from the stack and the air-inlet 23 are both provided with valves 24 25, whereby the volumes of air and neutral diluent in the draft-current may be maintained in predetermined proportion.

From the fuel-chamber 19 two openings 27 28 lead into the interior of the cylinder or hearth-chamber 10, through both of which the flame and gases from the fuel-bed pass into said hearth-chamber, and between these openings a partition or baffle 29 extends some distance into the hearth-chamber. On one side of this baffle is located the nozzle or outlet 30 of an air-pipe 31, said nozzle being directed downwardly and laterally toward that side of the cylinder up which the material is carried by the rotation of said cylinder. An air-compressor 32, connected with this pipe, furnishes compressed air therethrough, and a means of heating the air is provided by carrying the pipe as a chamber 33 through the clinker-cooler 14. Any other suitable means for heating the air may be adopted—as, for example, heating it on the regenerative principle through regenerators themselves heated by the stack-gases in any suitable manner. The heating of the air increases the activity of the localized combustion caused or promoted thereby.

In the operation of the invention the effect of the diluent derived through pipe 21 and passing through the ignited fuel-bed on the grate is to retard the combustion, the latter being sufficiently intense to produce a large evolution of combustible gases from the fuel, but of less intensity than the combustion of a fuel-bed or other body of fuel accomplished with a similar draft of pure air. The thickness of the fuel-bed need be no greater than the ordinary, and in general enough oxygen passes through the bed to eventually complete the combustion of the evolved gases, but owing to the dilution and inflation of the heating agent the combustible gases burn at an increased distance from the grate or seat of initial combustion, producing a long flame of increased volume, which fills the cross-section of the hearth-chamber to a greater degree than an ordinary flame, and hence comes nearer to the materials on the floor of said chamber. In this way the combustion of the fuel is made much more efficient and economical in respect to the materials under treatment than a flame which hugs the roof of the hearth-chamber. The maintenance of ignition is insured by reason of the combustion taking place in an enveloping region capable of attaining an igniting temperature and furnished by the fire-brick walls of the hearth-chamber and by the materials under treatment, which latter in the case of cement add to the heat by their chemical action. The flame produced with the diluent is one of a low heat intensity, particularly suited to the calcination of the lime in the cement-forming material, from which the carbon dioxid is by this process largely driven off before the final sintering or clinkering takes place. For the latter action a high heat is required, which I furnish through the agency of the jet delivered by the nozzle 30. This jet acting on the heating agent issuing through the opening 28 stirs or agitates its ingredients, bringing them together in intimate relation and producing an intense localized area of combustion which has the effect of sintering the material approaching the discharge end of the cylinder 10, said material having been previously calcined by the cooler part of the flame in the outer end of the hearth-chamber. The function of the baffle 29 is to protect the nozzle or jet-outlet 30 and prevent the flame and gases issuing through the outlet 27 from being drawn into the region of the jet.

One of the advantages of using the diluent and dividing the calcining from the clinkering step is that the temperature of the flame and the rate of fuel consumption may be more accurately regulated with respect to the rate of travel of the material through the kiln.

I do not wholly confine myself to the exact method described for intensifying the temperature of the clinkering flame, nor to the use of a single external fuel-bed, nor to a shallow fuel-bed. If a deeper bed is provided, much of the carbon dioxid in the draft-current will be reduced to carbon monoxid, which will still yield a flame suited to calcination without substantial or complete sintering, a suitable supply of secondary air being added to the outdraft from the fire-box.

I claim—

1. The herein-described process which consists in passing over a body of cement-forming material in an unobstructed reverberative chamber a flame supported from an external fuel-bed and regulated by means of a gaseous diluent passed through the fuel, to a temperature suited to calcination but not to complete sintering of the material.

2. The herein-described process which consists in treating cement-forming material with a low-temperature calcining-flame supported from an external fuel-bed, and sintering the material with a local high-temperature flame.

3. Process of burning cement which consists in subjecting the material to a calcining-flame produced from an external fuel-bed with a portion of stack-gases in the supply-current of the fire, and locally intensifying a portion of said flame with a gaseous jet to produce a clinkering temperature.

4. Process of burning cement which consists in feeding a stream of the cement-forming material along the hearth of a reverberative chamber, passing thereover in an opposite direction a long slow-burning flame given off from an external fuel-bed through which is passed under forced draft air and a portion of diluent stack-gases, and locally intensifying a portion of said flame near the exit of the material by means of a transverse jet of air intercepting the flame or gas-current and directed upon the material.

5. A cement-burning apparatus comprising a reverberative hearth-chamber having provision for advancing the material, an external fire-box opening into said chamber and having means for burning a bed of fuel, means for supplying air and a neutral gas to the draft-chamber of the fire-box whereby a long slow-burning flame is projected over the material on the hearth, and means for producing a local high-temperature flame to sinter the material near the end of its travel.

6. A cement-furnace comprising a rotary inclined barrel, an external fire-box opening into said barrel and having a fuel-support, means to supply a diluent gas to said fire-box anterior to the fuel-support, a jet-nozzle commanding the outlet of said fire-box and directed onto the floor of said barrel, and a source of compressed air connected with said jet-nozzle.

7. A cement-kiln comprising a rotary inclined barrel having a stack at one end, an external fire-box at the other end removable from the barrel and having a conduit connection between its ash-pit and the stack, and an air-jet nozzle carried by the fire-box and commanding the outlet therefrom into the barrel.

8. A cement-kiln comprising a material-treating flame-chamber, an external fire-box having a plurality of openings into said chamber, and an air-jet nozzle commanding one of said openings and arranged at an angle, to deflect the flame onto the floor of the chamber.

9. A cement-kiln comprising a reverberative chamber, an external fire-box having means for producing a slow-burning artificially-inflated flame, a partition dividing the outlet from said fire-box into a plurality of portions, and a jet-nozzle mounted on said partition and commanding one of the portions.

10. A furnace for burning cement and other materials comprising a rotary inclined barrel having means for introducing the materials at the upper end and removing them at the lower end, an external fire-box adapted to burn solid fuel and connected with one end of said barrel, means for returning a small portion of products of combustion to the draft-chamber of the fire-box for retarding the combustion, and means for regulating the quantity of said products returned.

11. A furnace for burning cement and other materials comprising a working chamber having means for advancing the material therethrough, means connected with said chamber for burning solid fuel externally thereof, means for forming separate flames at different points along said chamber from the combustion of said fuel, and means for rendering one of said flames substantially hotter than the other.

Signed at New York city, in the county of New York and State of New York, this 6th day of September, A. D. 1904.

BYRON E. ELDRED.

Witnesses:
CHAS. B. CRANE,
L. T. SHAW.